April 28, 1936. D. J. BRUNNER, JR 2,038,713
COLLISION GUARD FOR MOTOR VEHICLES
Filed April 22, 1935
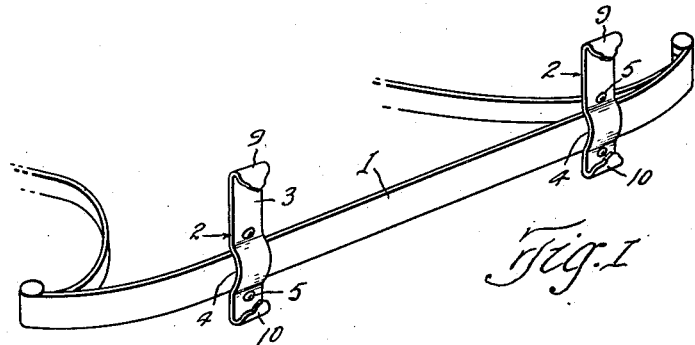
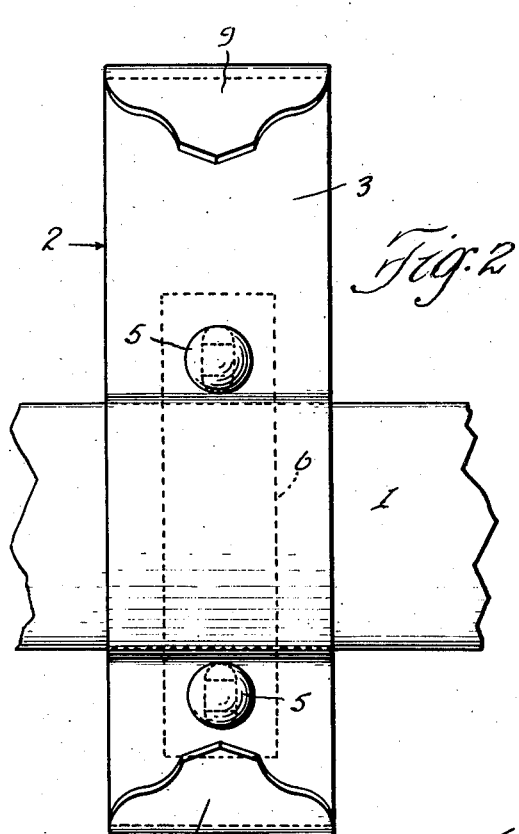
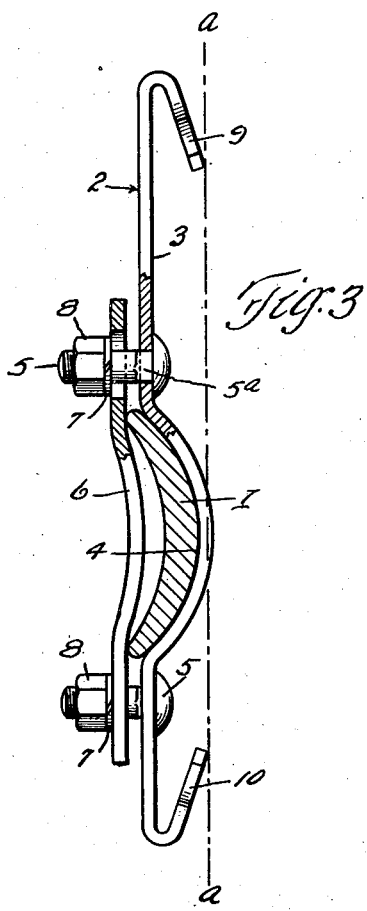
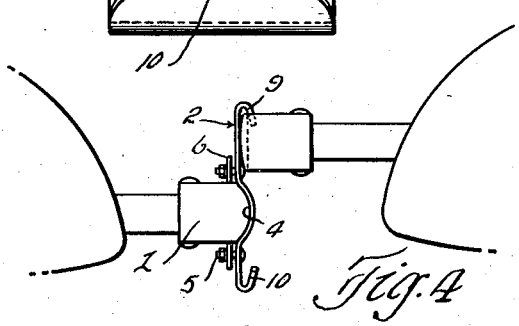
INVENTOR.
David John Brunner, Jr.
BY
Stull, Brock & West
ATTORNEYS.

Patented Apr. 28, 1936

2,038,713

UNITED STATES PATENT OFFICE 2,038,713

COLLISION GUARD FOR MOTOR VEHICLES

David John Brunner, Jr., Shaker Heights, Ohio

Application April 22, 1935, Serial No. 17,569

2 Claims. (Cl. 293—55)

This invention relates to collision guards or bumpers for motor vehicles, and in its more limited aspect has to do with attachments for bumpers, known as bumperettes, that have the effect of increasing the impact area of the bumpers.

Although attempts have heretofore been made with a limited measure of success to prevent the overriding of one automobile bumper by another when two collide, as by curving the upper and lower ends of the impact attachments or bumperettes away from the vehicle whereon they are mounted, much damage to fenders, lamps, radiators, fuel tanks, etc., continues to occur from this cause, and it is the purpose of my invention to positively overcome the difficulty by providing a collision guard or bumper, or a bumper attachment, incorporating pronounced hooks adjacent the top and bottom, or top or bottom, of the impact area and that are directed outwardly away from the vehicle and are in a position to catch a bumper or other obstruction that would otherwise ride over or under the bumper. A further object is to provide such hooks capable of engaging a bumper of another vehicle, on the vehicle side thereof, whereby to transfer the effective impact point toward the collision bar carrying such hooked portions and thereby to secure greater effective strength for a given weight of metal.

A further object of the invention is to provide an impact device or bumperette of the above mentioned character that is economical of manufacture, simple of construction and attachment, durable, and very effective in the attainment of its purpose.

In the accompanying drawing, wherein the present preferred form of the invention is illustrated, Fig. 1 is a perspective view of a bumper incorporating my improvements; Fig. 2 shows a fragment of a bumper bar in front elevation with my improved impact attachment or bumperette clamped thereto; Fig. 3 is a section through the bumper bar and shows the attachment or bumperette partly in section and partly in side elevation; and Fig. 4 is a diagrammatic view showing the manner in which the invention functions.

Turning now to a detailed description of the invention by the use of reference characters, 1 represents a bumper bar of the usual type, and secured to it in laterally spaced relation to each other are the impact devices or bumperettes designated generally by the reference numeral 2. Each is made up of a front plate 3, formed intermediate its ends with a seat 4 that is preferably designed to fit the contour of the outer surface of the bumper bar 1. In the present embodiment, the plate 3 is clamped to the bumper bar by means of bolts 5 and a shoe 6, the latter preferably being somewhat narrower than the plate 3 so as to be less conspicuous. The bolts 5 are of the style known as carriage bolts with square portions 5a adjacent their heads, and the plate 3 is provided with correspondingly shaped apertures for the reception of the portions 5a thereby to hold the bolts against turning. Lock washers 7 and nuts 8 are applied to the inner ends of the bolts 5, the nuts being drawn up tightly enough to place the parts under tension and thus securely hold them by friction to the bumper bar.

The upper and lower ends of the plate 3 are turned outwardly and thence toward each other to form pronounced hooks 9 and 10 that are preferably inside the vertical plane of the portion of the plate that seats upon the bumper bar, as indicated by the dot-and-dash line a—a in Fig. 3, so that the hooks will be protected in case the device strikes a wall or a pole or other like obstruction.

Referring now to Fig. 4: When a vehicle that is equipped with my invention collides with or is struck by a bumper of another vehicle and there is a tendency for one of the bumpers to override the other, the bumper of said other vehicle will be caught by the hooks 9 or 10 and be positively held against further relative elevation or depression, and damage which might otherwise occur is avoided.

While I have specifically illustrated and described the invention as consisting of attachments that are clamped to a standard bumper bar, it will be understood that the invention, broadly, comprehends a collision guard or bumper incorporating hooks adjacent the upper and lower, or upper or lower, limits of its impact area for positively preventing a bumper or similar object wherewith it collides from riding under or over it; and it will be further understood that in the case of attachments of the nature shown and described, they may be secured to the bumper bar in various ways, as by riveting or welding, or by other well known expedients.

Having thus described my invention, what I claim is:

1. In combination with a vehicle bumper collision bar, a collision guard carried thereby and extending transversely thereof and having its terminal portions extending away from the vehicle side of said bumper and in hook fashion toward each other, said terminal portions being spaced at their ends a distance greater than the vertical dimension of said bumper collision bar, whereby an inner surface of a hook portion may engage a bumper of another vehicle to transfer the effective impact point toward said collision bar.

2. In combination with a vehicle bumper collision bar, a collision guard carried thereby and extending transversely thereof and having a terminal portion formed into a hook, the free end of said hook extending opposite the vehicle side of said bumper and retrorsely toward the level of said collision bar whereby it is capable of engaging a bumper of another vehicle to transfer the effective impact point toward said collision bar.

DAVID JOHN BRUNNER, Jr.